United States Patent

[11] 3,530,913

[72] Inventors Charles M. Kline
Reinholds;
Allison W. Blanshine, Lititz; Albert M. Best, New Holland, Pennsylvania
[21] Appl. No. 546,280
[22] Filed April 29, 1966
[45] Patented Sept. 29, 1970
[73] Assignee Sperry Rand Corporation
New Holland, Pennsylvania
a corporation of Delaware

[54] CORN PROCESSOR
2 Claims, 7 Drawing Figs.
[52] U.S. Cl. .................................................. 146/71,
146/74, 146/76, 241/7, 241/10
[51] Int. Cl. ................................................... B02c 4/08
[50] Field of Search ........................................ 241/7, 10,
13, 78, 101, 159, 73, 74, 86, 88, 60; 146/76, 71, 74

[56] References Cited
UNITED STATES PATENTS

| 2,494,705 | 1/1950 | Hamilton | 241/60X |
| 2,557,344 | 6/1951 | Erickson | 241/ |
| 3,146,960 | 9/1964 | De Graff | 241/159 |
| 3,182,919 | 5/1965 | Geerlings | 241/101 |
| 3,194,288 | 7/1965 | Dodgen et al. | 241/78X |
| 3,199,796 | 8/1965 | Callum et al. | 241/101 |
| 3,348,780 | 10/1967 | Barkstrom et al. | 241/101 |

Primary Examiner—Frank T. Yost
Attorney—C. Hercus Just

ABSTRACT: This apparatus processes ears of corn to prepare the same for feeding to livestock. The apparatus shells the corn, separates the kernels from the cobs and husks, comminutes the kernels, and the cobs and husks, and then recombines the comminuted kernels, cobs and husks to make a feed mixture.

Patented Sept. 29, 1970

INVENTORS.
CHARLES M. KLINE
ALLISON W. BLANSHINE
ALBERT M. BEST

BY

ATTORNEY

Patented Sept. 29, 1970

INVENTORS.
CHARLES M. KLINE
ALLISON W. BLANSHINE
BY ALBERT M. BEST

ATTORNEY

Patented Sept. 29, 1970

3,530,913

INVENTORS.
CHARLES M. KLINE
ALLISON W. BLANSHINE
ALBERT M. BEST
BY
ATTORNEY

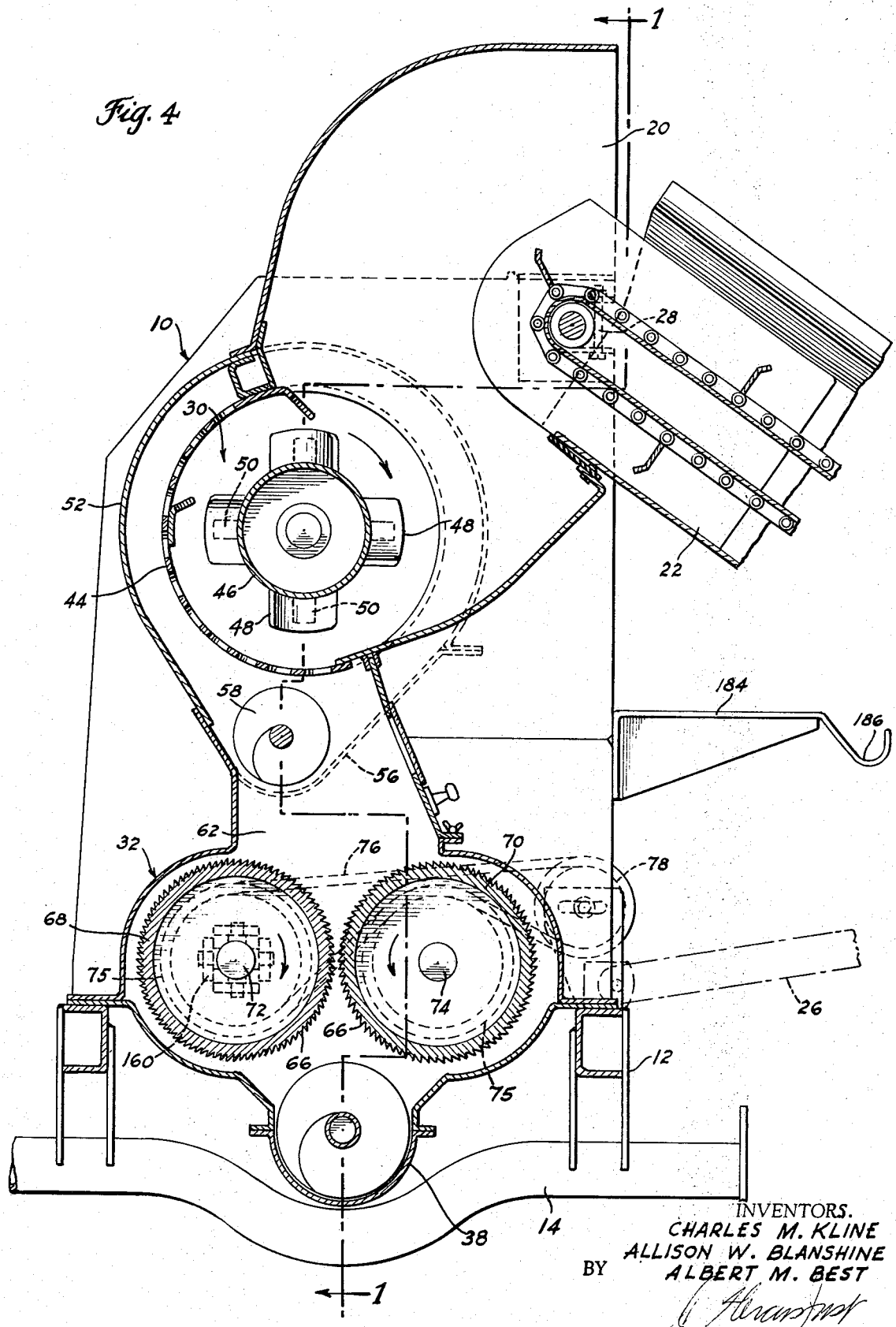

CORN PROCESSOR

For many years, corn has been fed to livestock, and especially cattle such as steers, in shelled condition. The cobs remaining from shelling operations frequently have posed a problem in suitably disposing of the same. In relatively recent years however, it has been found that cobs and any limited amount of husks remaining upon ears of corn after harvesting contain a certain amount of nutritional value for livestock, although the kernels of corn, by far, possess the greatest percentage of nutritional value in an ear of corn. In addition to the limited nutritional value of cobs and husks, especially in ground condition, they also provided needed roughage in cattle feed of the type to which the present invention pertains.

The processes employed at present for preparing ears of corn into a mixture of cracked or ground kernels of corn and chopped or otherwise decimated cobs and husks, utilize milling or chopping equipment of various types into which the entire ears of corn, sometimes including husks remaining thereon, are fed directly to the machine to reduce the same to usable size. Under such present methods however, it frequently is found that many of the kernels of the corn remain whole or, at the other extreme, are reduced substantially to meal condition. It also has been found that when whole kernels of corn are fed to livestock and especially cattle, it is difficult for the digestive mechanism and fluids of such animals to attack the hard, outer coating of a kernel of corn, whereupon a certain amount of such whole corn kernels pass entirely through the intestinal track of such animals without providing any nutritional value at all, the same being wasted by being discharged in the manure. Further, it also has been found that corn kernels which have only been cracked a minimum amount, so as to at least just barely expose the interior of the kernels, afford a higher degree of nutritional value to livestock, and especially cattle, than if the kernels of corn are reduced to meal condition.

In presently used procedures, it also is relatively common practice to resort to hammermills which involve a pounding operation and, as a result, it is practically impossible to prevent a large percentage of the kernels of corn from being reduced to meal condition incident to suitably reducing the corn cobs and husks to desirable size.

It is the principal object of the present invention to assume a different approach to the processing of ears of corn from what has been undertaken heretofore so as to provide a method resulting in a uniform and substantially homogeneous mixture of (1) cobs and any husks remaining upon the ears of corn which have been reduced to a predetermined size readily consumable by livestock and (2) kernels of corn which have been cracked only a very limited amount and, preferably, a minimum amount so as to afford maximum nutritional value to livestock from said cracked kernels while providing desirable roughage and limited nutritional value afforded by said cob and husk components of said mixture.

It is another object of the invention to provide a method of treating ears of corn and any husks remaining thereon by first subjecting the ears to a shelling operation to remove the kernels of corn from the cobs separate the shelled kernels from the cobs and any husks therein, and then separately reduce the cobs and husks to a predetermined size while the kernels are subjected to a cracking operation preferably suitable to produce a minimum amount of cracking of each kernel, and then recombine the material to produce a mixture of cracked kernels and chopped cobs and husks in substantially homogeneous condition.

It is a further object of the invention to provide a compact machine including mechanism to perform, preferably simultaneously and continuously, the steps of the aforementioned method of treating ears of corn and any husks thereon for the stated desired purpose.

It is still another object of the invention to provide a machine of the type described above in which a minimum amount of equipment and operational devices are included for purposes of achieving all of the steps of the desired method and including, in addition, a blower-type impelling means which receives the homogeneous mixture of cracked corn kernels and chopped cob material from the other operational elements of the machine and impels the same to a desired location, either for storage or direct feeding to livestock, such fan-type impellers serving further to blend together and even more thoroughly mix the components of the mixture produced by the other components of the machine.

It is a still further object of the invention to provide in the above-described machine a plurality of chopping means or units respectively capable of providing, in the order given, a chopped cob and husk product of predetermined maximum size which discharges into an additional chopping unit capable of further very substantially reducing the size of the cob material and any husks contained therein prior to the same being mixed with cracked kernels of corn.

It is another object of this invention to provide in a machine of the character described means for discharging a portion of the corn cobs and husks from the machine and to chop and intermix the retained portion whereby a desired ratio of cracked kernels and cobs-husks may be provided.

Still another object of the invention is to provide in a machine of the above described type relatively simple but highly effective cracking means to which the shelled kernels of corn are fed, said means preferably being adjustable to vary the cracking action thereof so as to adapt the same to the sizes of kernels predominately occurring in a given batch of ears of corn which are to be processed, depending, for example, upon the kind or type of corn being treated.

Details of the foregoing objects as well as details of the invention and other objects thereof are set forth in the following specifications and illustrated in the accompanying drawings comprising a part thereof.

In the drawings:

FIG. 3 is a front elevation of the machine shown in FIGS. 1 and 2.

FIG. 4 is an enlarged vertical sectional view of the machine shown in the preceding figures, as seen on the line 4–4 of FIG. 1.

FIG. 6 is a fragmentary sectional view of a detail of one of the auger conveyors shown in certain of the preceding figures.

FIG. 7 is a fragmentary end view showing the elevator mounted in transport position.

Figure 1:
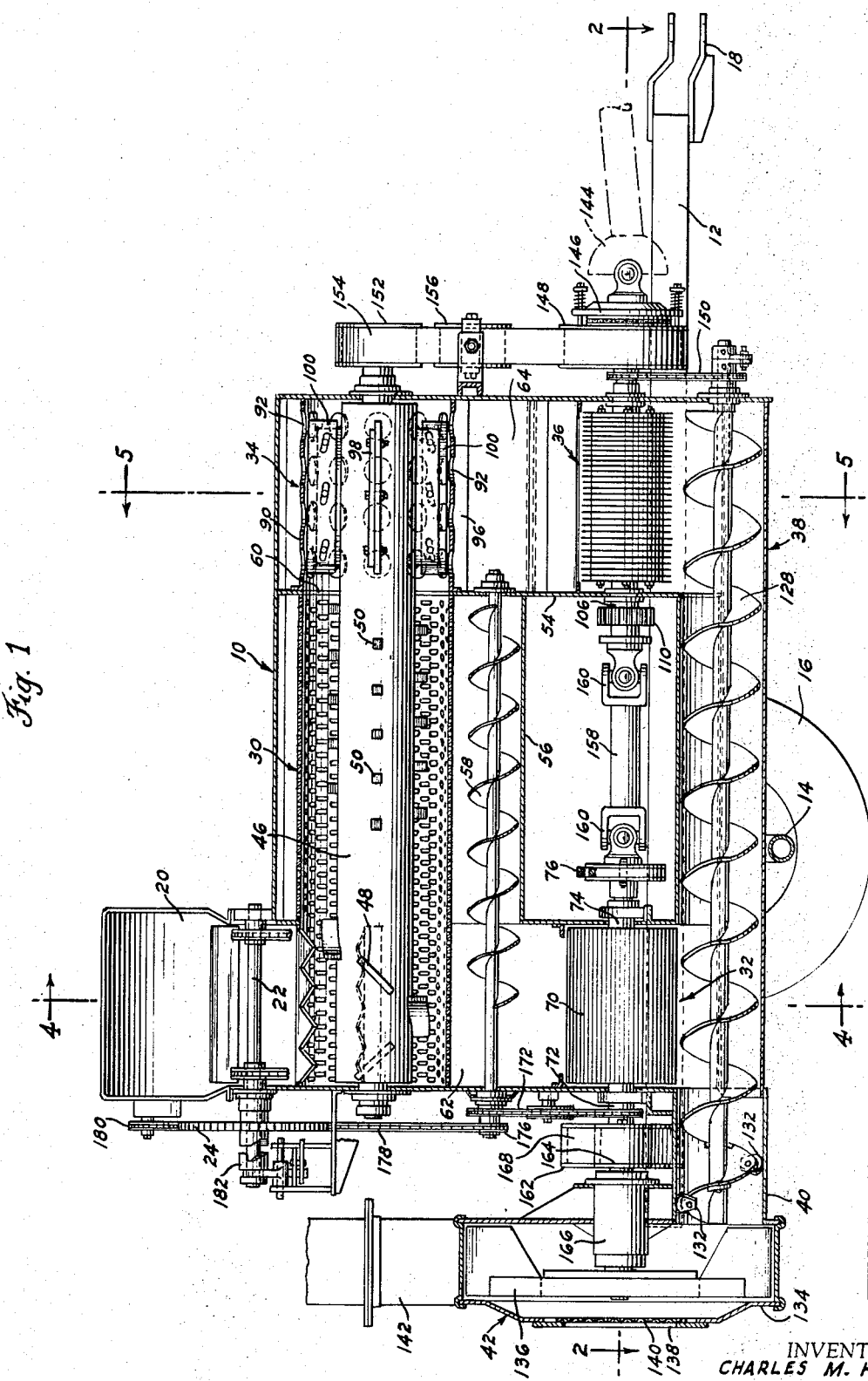
FIG. 1 is a vertical sectional elevation of a machine embodying the principles of the present invention and capable of performing the method thereof, as seen on the lines 1–1 of FIG. 4.

Referring particularly to FIG. 1, it will be seen that the machine comprising the present invention for performing the described method of treating corn is of a highly compact nature. It essentially comprises a casing or housing 10 supported by appropriate frame means 12, best shown in FIGS. 2 and 4, which also preferably includes an axle 14 upon the opposite ends of which suitable transporting wheels 16 are mounted. The wheels primarily are for purposes of transporting the machine to a desired location for use, such as adjacent storage means into which the process product is to be stored, or to a location where feed wagons are arranged to be filled for transportation to feed lots for livestock, such as cattle. The front end of the frame 12 is provided with hitch means 18 for suitably connecting to a tractor or the like.

The housing 10 preferably contains all of the operating units of the machine. As viewed in FIG. 1, adjacent the left-hand end of housing 10 is shielded inlet feed means 20 from which a portable elevator 22 extends outwardly and downwardly, the same embodying a conventional feed chain supported by shafts and sprockets at opposite ends and employing a drive sprocket 24 at the upper end thereof. Appropriate adjustable support means 26 are provided to dispose the elevator at the desired elevation, two exemplary positions of the elevator being shown in FIG. 3 respectively in full lines and in phantom. The upper end of the elevator 22 is connected by pivot means 28 to one side of housing 10 adjacent inlet means 20 so that when the machine is being transported, the elevator may be folded into transport position adjacent one side of the housing 10 as shown in FIG. 7.

Among the operational elements and units contained within housing 10, as shown in FIG. 1, are corn shelling means 30, kernel cracking means 32, coarse chopping means 34 for producing cobs and husks to predetermined maximum size, a relatively fine chopping means 36 preferably directly below the coarse chopping means 34, conveyor means 38 in the lower portion of housing 10 and extending from one end to the other thereof beneath the chopping means and the kernel cracking means. Said conveyor 38 moves material between said two means and to the exit end 40 of the housing 10 for the delivery of such mixed material to blower-type propelling means 42.

Details of the aforementioned elements and units of the entire machine will now be described substantially within the order in which they have been enumerated above. It will be seen from FIGS. 1 and 4 that the corn shelling means 30 extend substantially horizontally from the inlet feed means 20 to the coarse chopping means 34. It includes a substantially cylindrical, perforated shell 44 within which a hollow shaft 46 of fairly large diameter is rotatably mounted and is provided with radially and diagonally extending beaters 48 thereon which operate to initiate separation of the kernels of the ears from the cobs. These diagonally disposed beaters 48, as seen from FIG. 1, are immediately adjacent and directly below the feed means 20 and revolve in the direction of the arrows shown in FIG. 4, thereby also serving to propel the ears of corn to the right as viewed in FIG. 1. They then are further contacted forcefully by the radially extending lugs 50 which affect most of the shelling operation. The perforations within shell 44 are sufficiently large to permit ready discharge of shelled kernels therethrough for reception within the imperforate outer shell 52, which extends longitudinally between the left-hand end of housing 10 and an internal vertical wall 54 which separates the shelling means from the chopping means as can be seen from FIG. 1.

The lowermost portion of the outer shell 52 comprises a trough 56 within which a rotatable auger 58 is mounted, the same comprising a shaft extending beneath the shell 44 for the full length thereof. The auger 58 is driven by means to be described hereinafter for purposes of moving shelled kernels of corn from the trough 56 to the cracking means 32, as can be best seen from FIG. 1.

Also as is evident from FIG. 1, wall 54 has an opening 60 therein of substantially the same diameter as perforated shell 46 for purposes of permitting free lateral or longitudinal passage therethrough of bare cobs from which the kernels have been shelled, as well as any husks which originally were upon the ears of corn, into the uppermost, coarse chopping means 34. In this regard, it will be seen that the coarse chopping means 34 is coaxial and longitudinally continuous with the shelling means 30 and both are located in the upper portion of housing 10. Similarly, the cracking means 32 are substantially coaxial with the relatively fine chopping means 36 and are both in the lower portion of housing 10 as well as being substantially parallel to the axis of the shelling means and coarse chopping means in the upper portion of housing 10.

The left-hand end of casing 10, as viewed in FIG. 1, also comprises a substantially vertical, downward delivery means 62 through which the shelled kernels are directed to the cracking means 32. Similarly, at the right-hand end of the machine, as viewed in FIG. 1, there is also a vertical, downward delivery means 64 through which partially chopped cob material and the like is discharged from the coarse chopping means 34 to the relatively fine chopping means 36, which arrangement enhances the compactness of the entire machine.

Figure 2:
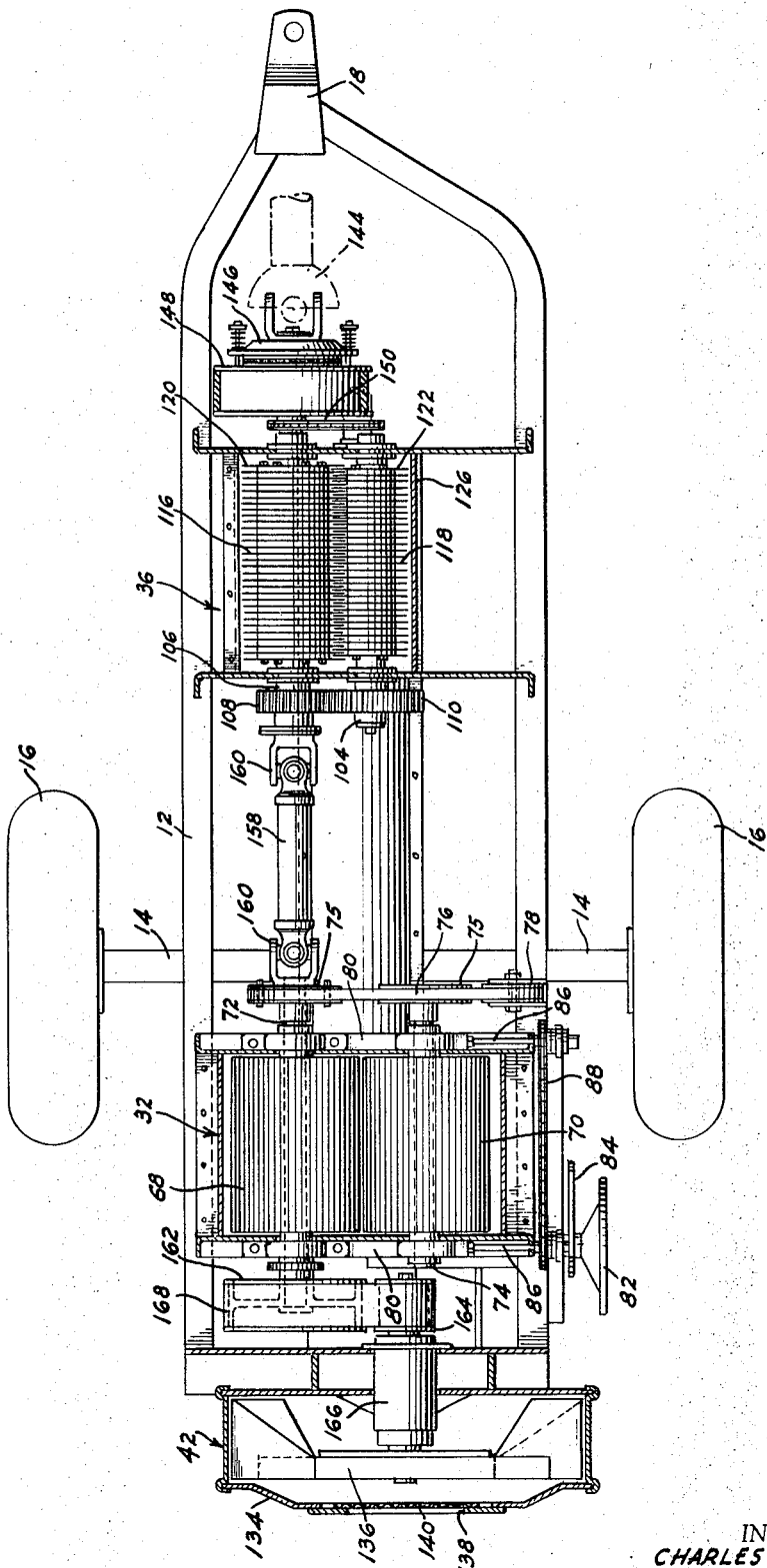
FIG. 2 is a horizontal sectional view of the machine shown in FIG. 1 as seen on the line 2–2 of FIG. 1.

As the shelled kernels of corn drop downward through delivery means 62, they pass between the relatively sharp and closely positioned longitudinally extending cracking ridges 66 (FIG. 4) which extend for the full length of each of the cooperating pair of cracking rolls 68 and 70. These rolls are driven, preferably at the same speed, so that the upper surfaces thereof move toward each other and thereby insure positive impingement of the kernels of corn between the rolls for opposing engagement by the sharp cracking ridges 66, thereby insuring positive cracking, without appreciable grinding of the kernels so as to avoid reducing the same to meal condition. To effect such drive, the shafts 72 and 74 which rotatably support the cracking rolls 68 and 70 respectively in appropriate bearings shown in FIG. 1, each have sheaves 75 fastened thereto at similar ends to accommodate a belt 76, as best shown in FIG. 2. Said belt also passes around a suitable tightening idler 78.

Referring to FIG. 2, it will be seen that the shaft 74 which supports cracking roll 70 is mounted within bearings which are slidable relative to horizontal supporting members 80. Simultaneous sliding or horizontal adjustment of the bearings is accomplished by operating a suitable hand wheel 82 or the like supported by an appropriate bracket 84. Said wheel operates threaded means shown in FIG. 2 by which a shaft 86 is moved horizontally to propel the bearing for the left-hand end of shaft 74, as viewed in FIG. 2, toward and from the opposite shaft 72. A similar shaft 86 extends from the other bearing for shaft 74 to similar threaded means. Appropriate sprockets are mounted upon said threaded means and are interconnected by sprocket chain 88, whereby when the hand wheel 82 is revolved in opposite directions, the bearings which support the opposite ends of shaft 74 both move similar distances in the same direction to effect variations in spacing between the cracking rolls 66 and 68.

It is highly desirable that such adjustment between said cracking rolls be made possible so as to insure the desired amount of preferably minimum cracking of the kernels of corn without pulverizing the same, for example, or otherwise reducing the kernels to meal condition but nevertheless insuring positive cracking of the kernels. It actually is only necessary to positively break the hard outer shell of each kernel so as to permit access to the interior of the kernels by the digesting fluids in the stomachs of livestock which are to eat the corn. Hence, the digestability afforded by the described mechanism as well as the particular arrangement of the cracking ridges 66 upon the cracking roll insures the desired amount of relatively minimum cracking of the kernels. Further, from FIG. 4, it will be seen that the substantially V-shaped entrance between the cracking rolls and the fact that the rolls extend for the full length of the cracking compartment and are shielded by the curved outer sides of the housing, insures positive engagement of all kernels of corn by the cracking rolls. Thereupon, the cracked kernels pass, by gravity, into the conveying means 38 which extend longitudinally along the lower portion of the housing 10.

Figure 5:
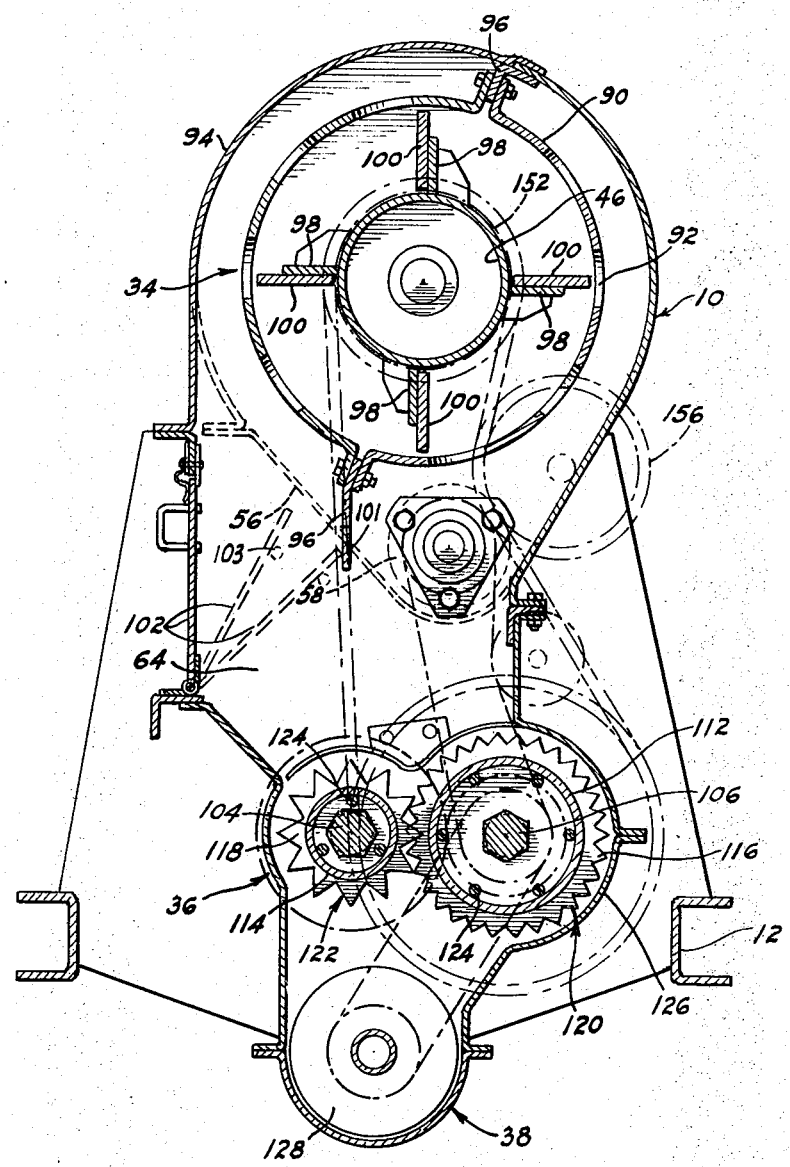
FIG. 5 is a vertical sectional view employing a scale similar to that used in FIG. 4 and showing certain details of the machine as seen on the line 5–5 of FIG. 1.

Referring especially to FIGS. 1 and 5, attention now is directed to the coarse chopping means 34 which is coaxial with the shelling means 30. It comprises a stationary inner shell 90 which has relatively large perforations 92 therein. Said shell somewhat acts as stationary shear means and is surrounded by an outer shell 94 which may comprise a continuation of the outer shell 52 that surrounds the perforated cylindrical shell 44 of the shelling means 30. Shell 90 is supported by appropriate longitudinal brackets 96 fixed relative to the outer shell 94.

Mounted upon hollow rotatable shaft 46, for simplicity of construction, are a plurality of longitudinally extending, radially disposed brackets 98. Supported by the brackets 98 are a plurality of longitudinally extending and radially disposed movable shearing blades 100. The outer edges thereof are spaced slightly from the inner surface of fixed, perforated shell 90. Thus, as the corn cobs and any husks associated therewith move from the shelling means 30 into the coarse chopping means 34, portions thereof are at least partially projected through the perforations 92, by centrifugal force and such projecting portions are sheared from the remainder of the cobs by the shearing coaction between the outer edges of the movable blades 100 and the peripheries of the perforations 92.

These chopped and severed cob portions, which are of a relatively coarse nature, are confined by the outer shell 94 for movement by gravity into the vertical downward delivery means 64 which actually comprises a space between the side walls which extend downward from the lower edges of the outer shell 94. One of these walls has a hinged door 102, see FIG. 5, through which access may be gained to the interior of delivery means 64. Said delivery means leads to the upper portion of the relatively fine chopping means 36.

In addition to providing access to the interior of the machine, door 102 serves as a diverter to discharge part or all of the cobs if the operator wishes to have a richer final mixture of feed, with more kernels and less chopped cobs. If the door is pivoted into the machine until it engages a deflector flap 101, all of the cobs will be ejected from the machine. If adjusted to an intermediate portion, part of the cobs will be discharged and part to pass downwardly to the fine chopping means 36. The door is held in an intermediate portion simply by projecting a bolt 103 through a suitable hole in housing 10 and tilting the door until it engages the bolt. A series of holes may be provided if various door positions are desired.

From FIGS. 1 and 5, it will also be seen that the relatively fine chopping means 36 comprises a pair of parallel rotatable shafts 104 and 106 which are driven in opposite rotary directions by means of meshed gears 108 and 110 respectively connected to similar ends of said shafts as shown in FIG. 2. Fixed to the shaft 106 are relatively large diameter spacers 112, while smaller spacers 114 are connected to shaft 104 for rotation therewith. From FIG. 2, it will be seen that the diameter of gear 108 is substantially larger than gear 110, whereby the shaft 106 revolves at a slower rate than shaft 104.

The spacers 112 and 114 each respectively support a series of closely located discs having sharply toothed peripheries, as best seen in FIG. 5. The discs 116 on spacers 112 are all of the same diameter but said diameter is larger than discs 118 which are supported on spacers 114. Preferably, the spacers 112 and 114 are sectional and actually comprise relatively short tubular rings which are disposed between and are tightly clamped with respect to the various toothed discs comprising the composite large chopping roll 120 and the relatively small chopping roll 122 which toothed discs comprise the active, operating means of the relatively fine chopping means 36. The short sections of the tubular spacers and the toothed discs of each of the chopping rolls are maintained in assembled relationship by a series of circumferentially spaced, elongated clamping bolts or rods 124 which are best shown in FIG. 5.

From FIG. 5, it will also be seen that the teeth of the toothed discs of the chopping rolls 120 and 122 overlap each other. In view of this and the relatively close spacing between the toothed discs on each of the chopping rolls, as well as the faster speed of the larger roll 120 than smaller roll 122, it will be seen that extensive chopping, shearing and comminuting of the relatively coarse pieces of cob and sections of husk material, which fall from the coarse chopping means 34, will occur. Such relatively fine cob and husk products are discharged by gravity into the conveying means 38 which communicates at one end with the lower portion of the housing 126 which surrounds the chopping rolls 120 and 122.

Rotatable within the conveying means 38 is an auger 128 of conventional type which extends the full length of the conveying means 38 and is operable to move the relatively finely divided cob and husk material from the right-hand end of the lower portion of the housing 10, as viewed in FIG. 1, toward the kernel cracking means 32 at the left-hand end of housing 10 as viewed in FIG. 1. As the chopped cob and husk material is moved to the left through conveying means 38, as viewed in FIG. 1, cracked kernels of corn are continuously being discharged from the cracking rolls 68 and 70 downwardly into the path of the oncoming chopped cob and husk material for continuous intermixture therewith to form a substantially homogeneous mixture of such cracked kernels and chopped cob material, the latter being in relatively fine size ranges so as readily to be mixed with the cracked kernels of corn.

To facilitate the discharge of such intermixed cracked kernels and chopped cob material from the exit end 40 of the conveying means 38, the auger 128 preferably has no bearing at said discharge end to support the same. Instead, appropriate means have been provided to support the left-hand end of the auger 128 as seen in FIG. 1, details of said supporting means being best illustrated in FIG. 6. The spiral flight 130 of the auger 128, at said delivery end thereof, is provided with a plurality of appropriate supporting shoes 132 which are fixed by any suitable means, such as rivets or the like, at spaced locations along the spiral periphery of the flight 130 as clearly shown in FIG. 6. One preferred material from which the shoes 132 may be formed comprises appropriate synthetic resin or plastics material, preferably of the self-lubricating type of which certain commercial types are available under such trademarks as "Teflon", "Delrin", or the like. The outer periphery of the shoes 32 is complementary to the cylindrical interior surface of the conveying means 38, whereby adequate and relatively wear-free support is provided for said exit end of the auger 128.

The exit end 40 of said conveying means discharges into a blower-type propelling means 134 within which a rotary fan 136 is mounted. The inlet 138 of said propelling means 134 may be covered with an appropriate screen 140 to protect an operator from possible injury by the rotating fan 136. The propelling means 134 has a discharge conduit 142 extending tangentially therefrom, and preferably being directed upwardly as shown in FIGS. 1 and 3.

As the previously mixed cracked corn kernels and chopped cob and husk material enter the propelling means 134 and are engaged by rotary fan 136, it is obvious that additional homogeneous intermixing and blending of the previously mixed material will take place, thereby insuring increased uniformity and homogeneity of the mixture as it is discharged through the conduit 142 for delivery either to storage, to feed-carrying wagons or the like, or to any other type of receiving means, as desired.

The driving means for the above-described mechanism is relatively simple and highly effective. It is primarily intended that the various movable members and elements of the entire machine shall be driven by appropriate drive means 144, shown in phantom in FIG. 1, which is connectable to suitable motor power such as a tractor. More particularly, the drive means 144 may be connected directly to a power take-off which is provided on most types of agricultural tractors. An appropriate friction clutch 146 extends between the drive means 144 and drive pulley 148 which is connected directly to the outer end of shaft 106. Hence, the large chopping roll 120 is directly driven by drive pulley 148, and, through the meshing gears 104 and 108, the small chopping roll 122 is directly driven by the large chopping roll. By means of appropriate sprocket gears respectively fixed to shaft 106 and the shaft of auger 128, around which a sprocket chain 150 extends, the auger also is driven from shaft 106 by drive pulley 148.

The large hollow shaft 46 in the upper part of housing 10, at the end thereof which supports the chopping means 34, is provided with a driven pulley 152 and the drive belt 154 extends around pulleys 152 and 148 for purposes of driving shaft 46 thereby. An appropriate tightening pulley 156 operates against belt 154 to maintain the same operatively tight.

An intermediate drive shaft 158 is connected at its opposite ends respectively with universal joints 160 between shaft 106 in the fine chopping means 36 and shaft 72 which supports and drives one of the cracking rolls 68 of cracking means 32. As mentioned above, belt 76, which extends around sheave 75 effects drive of the cracking roll 70 by cracking roll 68. If desired, suitable pulleys and an appropriate belt extending therearound may be used in lieu of a sprocket chain and sprocket gears which are specifically described above.

All of the remaining drive mechanism occurs at the left-hand end of the housing 10 as viewed in FIG. 1. Said remaining means comprises a pulley 162 fixed to the outer end of shaft 72. Another pulley 164 of smaller diameter than pulley 162 is fixed to the shaft which supports fan 136 within bearing 166 and a belt 168 extends around said pulleys to effect drive of fan 136 by shaft 72.

As seen especially from FIG. 3, a driving sprocket gear 170 is fixed to the outer end of shaft 72 for purposes of driving a sprocket chain 172 which extends around a driven sprocket gear 174 fixed to the outer end of the shaft of auger 58. A driving sprocket 176 also is fastened to the shaft of auger 58 outwardly from sprocket 174 thereon and a sprocket chain 178 extends around driving sprocket 176 and has an upper portion meshing with drive sprocket 24 for the elevator mechanism 22 as shown in FIG. 3. There also are appropriate idler sprockets 180 around which the sprocket chain 178 extends.

As shown in FIG. 1, there also preferably is a manually operable clutch 182 connected between sprocket gear 24 and the shaft of conveyor means 22 upon which the sprocket gear is rotatably mounted. When the clutch is disconnected, the sprocket gear 24 will idle upon said shaft and, conversely, when the clutch is engaged, the sprocket gear 24 will drive the flexible conveyor of elevator 22.

When the elevator 22 is mounted in folded, transport position such as illustrated in FIG. 7, an appropriate supporting bracket 184 is provided along the adjacent side of the housing 10 for purposes of readily supporting the same, the elevator being interlocked therewith by gravity due to the provision of a terminal hook 186 which receives an appropriate beaded edge 188 extending along one side of the elevator 22 as clearly shown in FIG. 7.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

We claim:

1. A corn processing machine to prepare ears of corn for livestock feeding comprising in combination, corn shelling means operable to receive ears of corn and shell the kernels of corn from the cob, means to separate the shelled kernels from the cobs and any husks which may be present, corn cracking means arranged to receive said shelled corn kernels and properly crack the same, chopping means operable to chop said cobs and any husks mixed therewith into predetermined size to comprise roughage, said chopping means including coarse chopping means operable to chop cobs and any husks to a predetermined maximum size, and additional chopping means positioned to receive chopped material from said coarse chopping means and operable to further reduce the size of the same, thereby to insure substantially uniform reduction in size of said cobs and any husks intermixed therein, discharge means disposed between said coarse chopping means and said additional chopping means whereby a portion of the cobs and any husks mixed therewith may be ejected from the machine to provide a desired ratio of chopped cobs and cracked kernels in the final product, and means operable to mix said cracked corn kernels and chopped roughage into a substantially homogenous mass while maintaining said cracked kernels substantially in the initially cracked size thereof, said shelling means being elongated and extending laterally from a feed inlet at one end thereof to said chopping means and operable to feed to said chopping means the cobs and any husks mixed therewith after separation of the shelled kernels therefrom.

2. A unitary corn processing machine comprising in combination, a housing, feed inlet means adjacent one end of said housing to receive ears of corn resulting from harvesting operations, shelling means operable to receive ears of corn from said feed inlet means and remove the kernels from the cobs of said ears, chopping means adjacent the opposite end of said housing positioned to receive cobs and any husks mixed therewith from said shelling means and chop the same into desired size ranges, said chopping means including coarse chopping means and fine chopping means, said shelling means and coarse chopping means being arranged in longitudinal alignment and having rotatable means therein operable upon a first common axis, kernel cracking means in said housing adjacent said first mentioned end of said housing below said shelling means, said cracking means and fine chopping means being arranged substantially in longitudinal alignment and having rotatable means therein operable upon a second common axis substantially parallel to and below said first common axis, means within said housing operable to separate said kernels from said cob and deliver the same kernels to said cracking means, conveying means in the lower part of said housing positioned beneath and extending between said cracking means and chopping means and operable to receive the material discharged from one of said means and move it toward the other means and also receive material therefrom and mix it with the material from said first-mentioned means before discharging the mixture from the machine, drive means interconnected to said housing and also being interconnectable to a source of motive power, and power transmitting means arranged to interconnect said drive means respectively to said shelling means and said cracking and chopping means to operate the same simultaneously to effect continuous processing of corn for desired periods of time.